(12) United States Patent
Faivishevsky

(10) Patent No.: US 8,165,383 B2
(45) Date of Patent: Apr. 24, 2012

(54) METHOD, SYSTEM AND COMPUTER PROGRAM PRODUCT FOR EDGE DETECTION

(75) Inventor: Lev Faivishevsky, Ramat-Gan (IL)

(73) Assignee: Applied Materials Israel, Ltd., Rehovot (IL)

( * ) Notice: Subject to any disclaimer, the term of this patent is extended or adjusted under 35 U.S.C. 154(b) by 882 days.

(21) Appl. No.: 12/237,284

(22) Filed: Sep. 24, 2008

(65) Prior Publication Data

US 2009/0238440 A1    Sep. 24, 2009

Related U.S. Application Data

(60) Provisional application No. 61/039,067, filed on Mar. 24, 2008.

(51) Int. Cl.
*G06K 9/00* (2006.01)

(52) U.S. Cl. .......................... 382/144; 382/263; 382/266

(58) Field of Classification Search ........................ None
See application file for complete search history.

(56) References Cited

U.S. PATENT DOCUMENTS

| | | | | |
|---|---|---|---|---|
| 4,648,120 A | * | 3/1987 | Chittineni | 382/266 |
| 2003/0190090 A1 | * | 10/2003 | Beeman et al. | 382/284 |
| 2004/0161141 A1 | * | 8/2004 | Dewaele | 382/132 |
| 2006/0066911 A1 | * | 3/2006 | Miller et al. | 358/3.27 |
| 2007/0031039 A1 | * | 2/2007 | Gallafent et al. | 382/173 |

OTHER PUBLICATIONS

Andreas Koschan, A Comparative Study on Color Edge Detection, Institute for Technical Informatics, Technical University Berlin, Dec. 1995, vol. III, pp. 574-578.*
Yitong Zhou et al., Edge Detection Using Zero Crossings of Dirrectional Derivatives of a Random Field Model, ICASSP 86, Tokyo, 1986, pp. 1465-1468.*
Miroslav Hagara et al., Plus Operator for Edge Detection in Digital Images, Dept. of Radioelectronic FEI SUT, Bratislava, Slovakia, date unknown, four pages.*

* cited by examiner

*Primary Examiner* — Brian Werner

(74) *Attorney, Agent, or Firm* — SNR Denton US LLP

(57) ABSTRACT

A method for edge detection, the method includes: obtaining an image of an area of a lithographic mask; wherein the image is generated by an optical system that is partially coherent; calculating a gradient of the image and a second derivative of the image in a direction of the gradient of the image; calculating a function that is proportional to the second derivative of the image in the direction of the gradient of the image and is inversely proportional to a ratio between a square of the gradient of the image and the image; and detecting at least one edge of at least one feature of the area in response to values of the function.

20 Claims, 7 Drawing Sheets

700

_US 8,165,383 B2_

METHOD, SYSTEM AND COMPUTER PROGRAM PRODUCT FOR EDGE DETECTION

RELATED APPLICATIONS

This application is a nonprovisional of, claims priority to and incorporates by reference U.S. provisional patent application Ser. No. 61/039,067, filed 24 Mar. 2008.

FIELD OF THE INVENTION

This disclosure relates generally to a method, system and a computer program product for edge detection.

BACKGROUND

The optical microlithography industry is permanently challenged by reduction of feature sizes. The significance of small defects in masks (also referred to as reticles, lithographic masks or photomasks) grows accordingly. The systematic deviations of features from the intended design become significant and should be measured with increasing accuracy. Therefore the ability to extract exact information of a photomask content in a precise, robust and fast manner is of increasing importance.

Mask inspection by aerial imaging is used to evaluate masks. The basic purpose is to conclude about mask contents by analysis of corresponding aerial image. Such analysis should result in precise information about patterns presented in the mask. For instance, critical dimension (CD) widths of patterns may have to be found. The most important part of the inspection is pattern defects detection. Any significant discrepancy of a pattern with respect to its desired form, which is stored in a database, should be detected.

Edge detection is a significant tool of the analysis. The task of edge detection is to recover a pattern shape (contour). Contours provide important information about pattern size (CD) and possible defects such as edge extrusion/intrusion, corner extrusion/intrusion etc.

Recent studies of CD of rectangular patterns (contacts) by simulations and machine inspections in partial coherent optical imaging have shown significant bias in CD evaluation by image edge detection with the help of standard edge detection techniques. Namely, in simulations the measured contact size were 20% smaller than given by the Data Base of the mask, while in machine the bias were much smaller ~2.5%. The possible explanation for the bias in simulations was an assumption of incorrectness of current edge detection approaches for edge detection in optical imaging.

There is a growing need to provide more accurate manners to detect edges.

SUMMARY

The present invention provides methods and systems as described in the accompanying claims. Specific embodiments of the invention are set forth in the dependent claims. These and other aspects of the invention will be apparent from and elucidated with reference to the embodiments described hereinafter.

A method for edge detection is provided, the method includes: obtaining an image of an area of a lithographic mask; wherein the image is generated by an optical system that is partially coherent; calculating a gradient of the image and a second derivative of the image in a direction of the gradient of the image; calculating a function that is proportional to the second derivative of the image in the direction of the gradient of the image and is inversely proportional to a ratio between a square of the gradient of the image and the image; and detecting at least one edge of at least one feature of the area in response to values of the function.

The method can include calculating the function by subtracting from one half of the second derivative of the image in the direction of the gradient of the image one fourth of the ratio between the square of the gradient of the image and the image and detecting the at least one edge by searching for zero crossings of the function.

The method can include detecting a location of the at least one edge by compensating for misalignments introduced by the optical system.

The method can include determining a critical dimension in response to a difference between locations of edges regardless of misalignments introduced by the optical system.

The method can include determining a critical dimension in response to a difference between locations of edges.

The method can include calculating the second derivative of the image in the direction of the gradient of the image by: $(I_x^2 * I_{xx} + 2 * I_x * I_y * I_{xy} + I_y^2 * I_{yy})/(I_x^2 + I_y^2)$; wherein $I_x$ is a partial derivative in a horizontal direction of the image, $I_{xx}$ is a second order partial derivative in the horizontal direction of the image, $I_y$ is a partial derivative in a vertical direction of the image, $I_{yy}$ is a second order partial derivative in the vertical direction of the image; and $I_{xy}$ is a second order mixed partial derivative in the horizontal and vertical directions of the image.

The method can include optically obtaining the image.

A system for edge detection is provided, the system includes: a memory unit configured to receive an image of an area of a lithographic mask; wherein the image is generated by an optical system that is partially coherent; a gradient calculator configured to calculate a gradient of the image; a second derivative calculator configured to calculate the second derivative of the image in a direction of the gradient of the image; a function calculator that is configured to calculate a function that is proportional to the second derivative of the image in the direction of the gradient of the image and is inversely proportional to a ratio between a square of the gradient of the image and the image; and an edge detector configured to detect at least one edge of at least one feature of the area in response to values of the function.

The function calculator can be configured to calculate the function by subtracting from one half of the second derivative of the image in the direction of the gradient of the image one fourth of the ratio between the square of the gradient of the image and the image and detecting the at least one edge by searching for zero crossings of the function.

The edge detector can be configured to detect a location of the at least one edge by compensating for misalignments introduced by the optical system.

The system can include a critical dimension unit configured to determine a critical dimension in response to a difference between locations of edges regardless of misalignments introduced by the optical system.

The critical dimension unit can determine a critical dimension in response to a difference between locations of edges.

The function calculator can be configured to calculate the second derivative of the image in the direction of the gradient of the image by: $(I_x^2 * I_{xx} + 2 * I_x * I_y * I_{xy} + I_y^2 * I_{yy})/(I_x^2 + I_y^2)$; wherein $I_x$ is a partial derivative in a horizontal direction of the image, $I_{xx}$ is a second order partial derivative in the horizontal direction of the image, $I_y$ is a partial derivative in a vertical direction of the image, $I_{yy}$ is a second order partial derivative in the vertical direction of the image; and $I_{yx}$ is a second order mixed partial derivative in the horizontal and vertical directions of the image.

The system can include an optical system configured to optically obtain the image.

A computer program product is provided. It can include a computer readable medium that stores instructions for: obtaining an image of an area of a lithographic mask; wherein the image is generated by an optical system that is partially coherent; calculating a gradient of the image and a second derivative of the image in a direction of the gradient of the image; calculating a function that is proportional to the second derivative of the image in the direction of the gradient of the image and is inversely proportional to a ratio between a square of the gradient of the image and the image; and detecting at least one edge of at least one feature of the area in response to values of the function.

The computer readable medium can store instructions for: calculating the function by subtracting from one half of the second derivative of the image in the direction of the gradient of the image one fourth of the ratio between the square of the gradient of the image and the image and detecting the at least one edge by searching for zero crossings of the function.

The computer readable medium can store instructions for detecting a location of the at least one edge by compensating for misalignments introduced by the optical system.

The computer readable medium can store instructions for determining a critical dimension in response to a difference between locations of edges regardless of misalignments introduced by the optical system.

The computer readable medium can store instructions for comprising determining a critical dimension in response to a difference between locations of edges.

The computer readable medium can store instructions for calculating the second derivative of the image in the direction of the gradient of the image by: $(I_x^2*I_{xx}+2*I_x*I_y*I_{xy}+I_y^2*I_{yy})/(I_x^2+I_y^2)$; wherein $I_x$ is a partial derivative in a horizontal direction of the image, $I_{xx}$ is a second order partial derivative in the horizontal direction of the image, $I_y$ is a partial derivative in a vertical direction of the image, $I_{yy}$ is a second order partial derivative in the vertical direction of the image; and $I_{yx}$ is a second order mixed partial derivative in the horizontal and vertical directions of the image.

BRIEF DESCRIPTION OF THE DRAWINGS

Further details, aspects, and embodiments of the invention will be described, by way of example only, with reference to the drawings.

DETAILED DESCRIPTION

Figure 1:
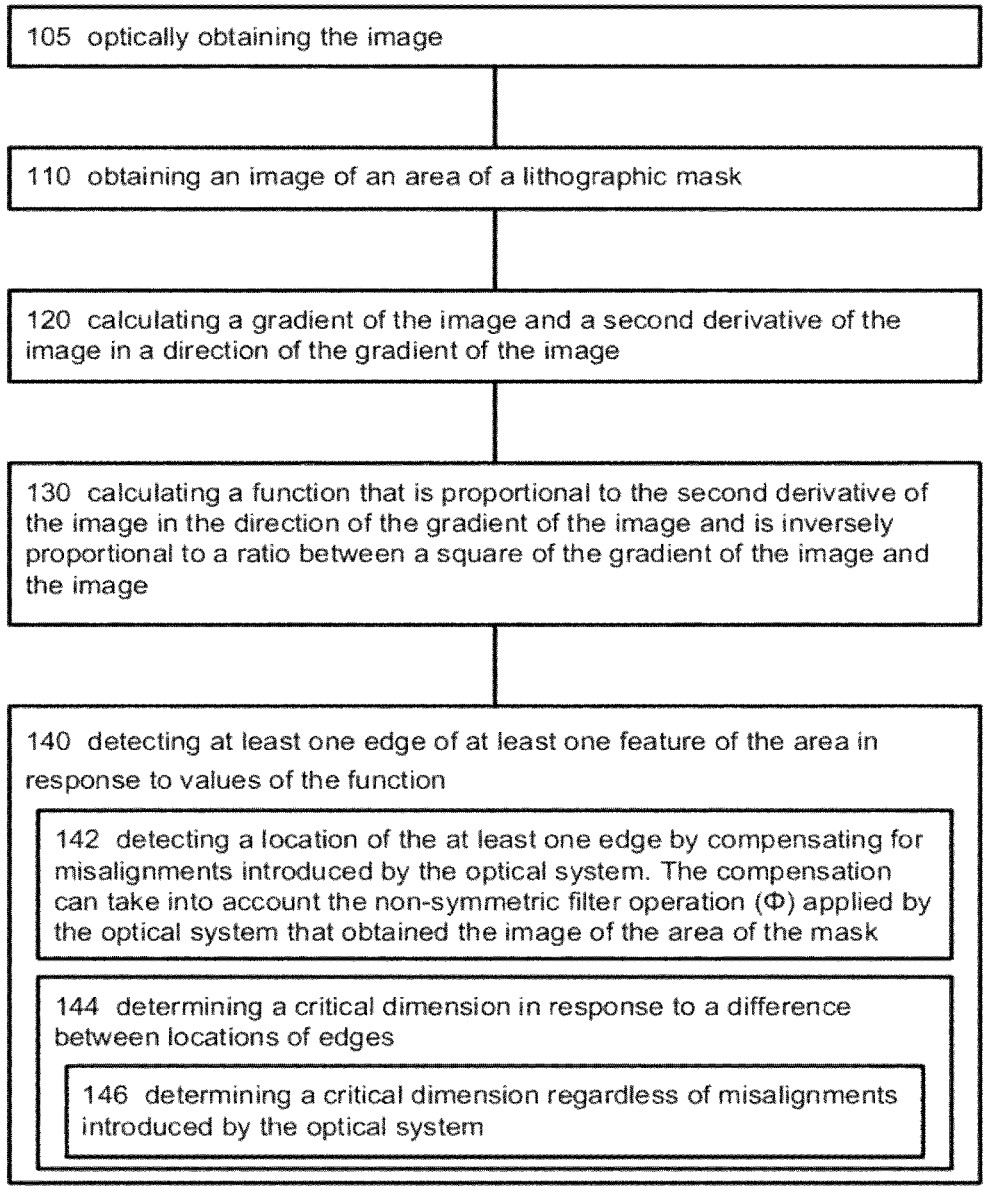
FIG. 1 schematically shows an embodiment of a edge detection method according to an embodiment of the invention.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

It has been shown that edges of features of areas of a mask can be estimated by finding zero crossings of a function that is responsive to the second derivative of the image in the direction of the gradient of the image and to the ratio between the square of the gradient of the image.

Partial Coherent Optical Imaging

It is assumed that partially coherent optical system (optical systems with small coherency factor) the aerial image (denoted I) generated by illuminating a mask (denoted g) can be described by Hopkins' formula:

$$I(\bar{z}) = \iint g(\bar{x}_1) \cdot g^*(\bar{x}_2) \cdot K(\bar{z}, x_1) \cdot K^*(\bar{z}, x_2) \cdot h(\bar{x}_1, \bar{x}_2) d\bar{x}_1 \cdot d\bar{x}_2 \quad (1)$$

where K is point spread function (PSF) of the image projection system, h is mutual intensity function describing coherence properties, g is transparency of the mask, $x_1$, $x_2$ are coordinates in the mask plane, z is the coordinate in the image plane.

Equation (1) can be formulated in a concise form:

$$I(\bar{z}) \sum_{i=1}^{n} \left| \int_{\bar{z}-\Xi} g(\bar{z}-\vec{x}) \cdot \Phi_i(\vec{x}) \cdot d\vec{x} \right|^2 = \sum_{i=1}^{n} |g \otimes \Phi_i|^2 \quad (2)$$

where kernels $\Phi_i$ describe totally the optical system.

It is further assumed that, kernels $\Phi_i$ are fast decreasing functions, so that $\|\Phi_i\| \gg \|\Phi_{i+1}\|$ for small i. This assumption holds for the large spectrum of exposure conditions of modern lithography and mask inspection tools.

From the above assumptions it can be concluded that the image formation in the optical system is governed by a quadratic equation:

$$I(\bar{z}) \sim |g \otimes \Phi|^2 \quad (3)$$

Analysis of Traditional Edge Detection Techniques

Traditional non-optical edge detection techniques rely on an assumption that the edge position in the object corresponds to maximal gradient region in the image, or, by other words, to zero crossing by second derivative of the observed image. Namely, if the image I is obtained from ideal object g by degradation kernel $\Phi$, i.e.

$$I(\bar{z}) = \Phi \otimes g \quad (4)$$

By the rule of differentiation of convolution the gradient of image may be obtained as:

$$\nabla I(\bar{z}) = \nabla(\Phi \otimes g) = \Phi \otimes \nabla g \quad (5)$$

In the simplification for a one-dimensional case the equation can rewritten as $$\frac{\partial I(z)}{\partial z} = \frac{\partial}{\partial z}(\Phi \otimes g) = \Phi \otimes \frac{\partial g}{\partial z} \qquad (6)$$

The second derivative can also be calculated by a similar technique:

$$\frac{\partial^2 I(z)}{\partial z^2} = \frac{\partial^2}{\partial z^2}(\Phi \otimes g) = \Phi \otimes \frac{\partial^2 g}{\partial^2 z} \qquad (7)$$

Thus for a optical system that applies a symmetric filter $\Phi$ the maximum of gradient in the mask g (or zero of its second derivative) leads to maximum of gradient in the observed image I (or zero of the image second derivative). It means that it is sufficient in the degradation scenario to calculate maximal gradient curves (or zero crossing of the second derivative) in the image in order to obtain edges in the object of interest.

Moreover, optical systems that apply a non-symmetric filter $\Phi$ with a possible shift change the location of the edge in the image. Nevertheless—critical dimension measurements can be conducted regardless of this distortion, assuming that the distance between adjacent edges remains the same. This assumption is valid as the optical system is linear time invariant (LTI).

There are a number of known edge detection schemes. Most of them are based on finding of maximal gradient curves or zero crossings of the image second derivative. Such methods differ by numerical way of evaluating gradients or second derivatives in images. Among gradient methods one should mention Sobel, Prewitt, Roberts, Canny and others. Second derivative methods include Zero-crossing detector, Laplacian of a Gaussian detector and others.

All the above techniques assume (4) as an image model. In case of images governed by (3) such methods are no longer relevant.

Image, Image Gradient and Second Derivative of Image in the Direction of Gradient Responsive Edge Detection Bask Derivation for One-Dimensional Case The optical image for a partial coherent optical system is approximately described by equation (3). For simplification, an analysis of the one-dimensional case is provided. Differentiating the equation (3) gives the following results:

$$\frac{\partial I(\vec{z})}{\partial z} \sim \frac{\partial |g \otimes \Phi|^2}{\partial z} = 2\text{Re}\left((\Phi \otimes g) \cdot \left(\Phi \otimes \frac{\partial g}{\partial z}\right)\right) \qquad (8)$$

where $\circ$ means by-term multiplication.

Assuming that $\Phi$ is a real function the equation may be further simplified to be $$\frac{\partial I(\vec{z})}{\partial z} \sim \frac{\partial |\Phi \otimes g|^2}{\partial z} = 2(\Phi \otimes g) \cdot \left(\Phi \otimes \frac{\partial g}{\partial z}\right) \qquad (9)$$

Taking the second derivative gives the following equation:

$$\frac{\partial^2 I(\vec{z})}{\partial z^2} = 2(\Phi \otimes g) \cdot \left(\Phi \otimes \frac{\partial^2 g}{\partial x^2}\right) + 2\left(\Phi \otimes \frac{\partial g}{\partial z}\right)^2 \qquad (10)$$

Substituting (3) and (9) into (10) gives:

$$\frac{\partial^2 I(\vec{z})}{\partial z^2} = 2(\Phi \otimes g) \cdot \left(\Phi \otimes \frac{\partial^2 g}{\partial z^2}\right) + \frac{1}{2}\frac{\left(\frac{\partial I}{\partial z}\right)^2}{I} \qquad (11)$$

Analyzing the right hand side of the equation (11) gives the following conclusions. Zero crossing in the second derivative of image I now does not mean zero-crossing in the object of interest (mask) g. The last term in the sum is strictly positive and significant in a region of an edge in the image (the gradient of image is maximal in the region of edge).

This means that zero crossing in the image corresponds to the region of negative second derivative in the object. The second derivative is negative inside the pattern therefore the CD recovered by naïve zero crossing will always be smaller in the image reality—that means that the pattern will shrink. It is precisely the observed phenomenon.

The last term is expressed by quantities actually observed in the image: the gradient and the image itself, so from there one may obtain the expression with the second derivative of the mask in the left hand side and observed image quantities:

$$(\Phi \otimes g) \cdot \left(\Phi \otimes \frac{\partial^2 g}{\partial z^2}\right) = \frac{1}{2}\frac{\partial^2 I_\Phi(\vec{z})}{\partial z^2} - \frac{1}{4}\frac{\left(\frac{\partial I}{\partial z}\right)^2}{I} \qquad (12)$$

As can be seen from equation 12—zero of the left hand side corresponds to zero crossing of the second derivative of the mask. Such zeros may be recovered using expression of the right hand side because the right hand side contains only quantities that can be measured in the image.

Generalization for Two-Dimensional Case

Though both analytical calculations and qualitative speculations are better understood in one dimensional case, the two dimensional case is of real practical interest. In the two dimensional case there is an interest in finding regions where the second derivative of mask in the direction of gradient equals to zero.

After vector algebra analytical calculations the following formula for the second derivative in the direction of gradient of mask $$\frac{\partial^2 g}{\partial \vec{r}_{grad}^2}$$

is obtained:

$$(\Phi * g) \cdot \left(\Phi * \frac{\partial^2 g}{\partial \vec{r}_{grad}^2}\right) = \frac{1}{2}\frac{\partial^2 I(\vec{z})}{\partial \vec{r}_{grad}^2} - \frac{1}{4}\frac{|\nabla I|^2}{I} \qquad (13)$$

where $\frac{\partial^2 I(\vec{z})}{\partial \vec{r}_{grad}^2}$ is the second derivative of image in the direction of gradient and $\nabla I$ is the gradient of the image.

All the right hand side terms are calculated directly form the image I and its partial first and second derivatives in horizontal and vertical directions $I_x, I_y, I_{xy}, I_{xx}, I_{xy}$:

$$|\nabla I|^2 = I_x^2 + I_y^2 \quad (14)$$

$$\frac{\partial^2 I(\vec{z})}{\partial \vec{r}_{grad}^2} = \frac{I_x^2 I_{xx} + 2I_x I_y I_{xy} + I_y^2 I_{yy}}{I_x^2 + I_y^2} \quad (15)$$

Equation (13) can be viewed as a logical generalization of (12) for the two dimensional case. Here the second order derivatives of mask and image are changed for the second derivative in the direction of gradient of mask and image respectively. The first derivative is changed by the gradient of the image.

The last remark is as in a linear case for a non-symmetric filter Φ with a possible shift one cannot hope to recover the actual position of the edge. However, if the measurement is done through the critical dimension of the pattern, the correct CD size of it can still be recovered as difference between two edges in the image because the system (3) is time-invariant.

It means that the contour obtained by the edge detection will be the same as the mask pattern up to a possible misplacement. Such misplacement may be evaluated in two ways. First, the displacement may be evaluated by investigation of the impulse reaction of a non-symmetric filter Φ. Second, one may calculate distances between contours of different patterns in the mask and compare them with appropriate distances in a corresponding database.

FIG. 1 illustrates method 100 according to an embodiment of the invention.

Method 100 starts by stage 110 of obtaining an image of an area of a lithographic mask. The image is generated by an optical system that is partially coherent. The area can include the entire mask, a large portion of the mask or even a small area of the mask. The area is expected to include one or more features such as patterns.

Stage 110 is followed by stage 120 of calculating a gradient of the image and a second derivative of the image in a direction of the gradient of the image. Various methods can be applied for calculating the gradient of the image as well as the second derivative of the image in the direction of the gradient. Multiple intermediate images (such as a gradient image, a second derivative image) can be generated during the calculation but this is not necessarily so. The image includes multiple pixels and each pixel has an intensity value. The intensity value can be represented by a gray level value.

Stage 120 can include solving equation (15)—calculating the second derivative of the image in the direction of the gradient of the image by: $(I_x^2 * I_{xx} + 2 * I_x * I_y * I_{xy} + I_y^2 * I_{yy})/(I_x^2 + I_y^2)$; wherein $I_x$ is a partial derivative in a horizontal direction of the image, $I_{xx}$ is a second order partial derivative in the horizontal direction of the image, $I_y$ is a partial derivative in a vertical direction of the image, $I_{yy}$ is a second order partial derivative in the vertical direction of the image; and $I_{yx}$ is a second order mixed partial derivative in the horizontal and vertical directions of the image.

Stage 120 is followed by stage 130 of calculating a function that is proportional to the second derivative of the image in the direction of the gradient of the image and is inversely proportional to a ratio between a square of the gradient of the image and the image.

Stage 130 can include calculating the function by subtracting from one half of the second derivative of the image in the direction of the gradient of the image one fourth of the ratio between the square of the gradient of the image and the image and detecting the at least one edge by searching for zero crossings of the function. For example, stage 130 can include finding zero crossing of the right hand side of equation 12. It is noted that the detection of zero crossing can include calculating functions that have the following format:

$$F = K * \frac{\partial^2 I(\vec{z})}{\partial \vec{r}_{grad}^2} - \frac{K}{4} \frac{|\nabla I|^2}{I}.$$

Stage 130 is followed by stage 140 of detecting at least one edge of at least one feature of the area in response to values of the function.

Stage 140 can include stage 142 of detecting a location of the at least one edge by compensating for misalignments introduced by the optical system. The compensation can take into account the non-symmetric filter operation (Φ) applied by the optical system that obtained the image of the area of the mask.

Stage 140 can include stage 144 of determining a critical dimension in response to a difference between locations of edges.

Stage 144 can include stage 146 of determining a critical dimension regardless of misalignments introduced by the optical system. It is assumed that both edges are displaced by the same displacement so that the critical dimension can be calculated without compensating for the misalignment. The critical dimension can reflect a width of a feature or a distance between adjacent features.

Stage 140 can include edge smoothing or applying other functions that can reduce noises and suspected errors in the location of the edge.

Method 100 can be executed by a system that optically obtains the image but this is not necessarily so and it can be executed by a system that receives (electronically or optically) information representative of an image that was optically obtained by another system. If the former is applicable method 100 can include stage 105 of optically obtaining the image. Stage 105 includes utilizing a partially coherent optical system.

Figure 2:
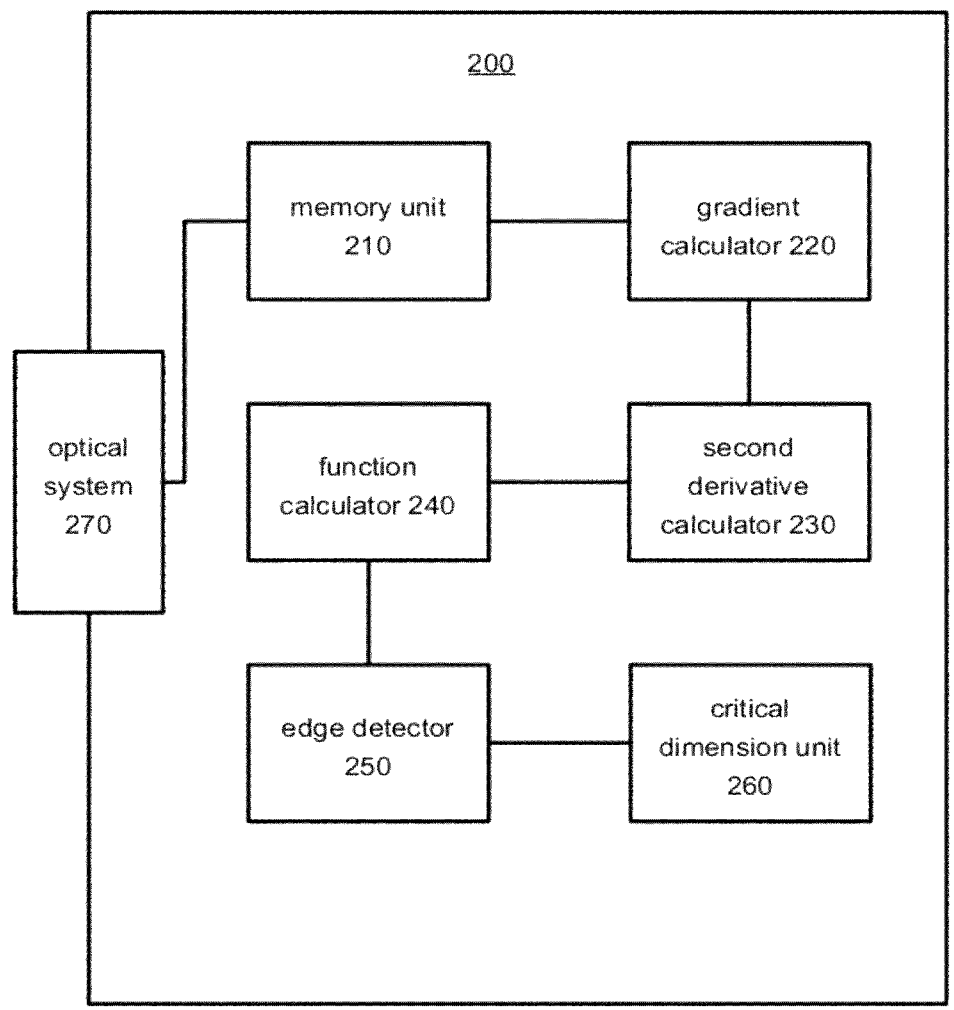
FIG. 2 schematically shows an embodiment of a edge detection system according to an embodiment of the invention.

FIG. 2 illustrates system 200 for edge detection, according to an embodiment of the invention. System 200 includes: (i) memory unit 210 configured to receive an image of an area of a lithographic mask; wherein the image is generated by an optical system that is partially coherent; (ii) gradient calculator 220 configured to calculate a gradient of the image; (iii) second derivative calculator 230 configured to calculate the second derivative of the image in a direction of the gradient of the image; (iv) function calculator 240 that is configured to calculate a function that is proportional to the second derivative of the image in the direction of the gradient of the image and is inversely proportional to a ratio between a square of the gradient of the image and the image; and (v) edge detector 250 configured to detect at least one edge of at least one feature of the area in response to values of the function.

Function calculator 240 is configured to calculate the function by subtracting from one half of the second derivative of the image in the direction of the gradient of the image one fourth of the ratio between the square of the gradient of the image and the image and detecting the at least one edge by searching for zero crossings of the function.

Edge detector 250 is configured to detect a location of the at least one edge by compensating for misalignments introduced by the optical system.

System 200 can include critical dimension unit 260 configured to determine a critical dimension in response to a difference between locations of edges regardless of misalignments introduced by the optical system.

Critical dimension unit 260 can determine a critical dimension in response to a difference between locations of edges.

Second derivative calculator 230 can be configured to calculate the second derivative of the image in the direction of the gradient of the image by: $(I_x^2 * I_{xx} + 2*I_x*I_y*I_{xy} + I_y^2*I_{yy})/(I_x^2+I_y^2)$; wherein $I_x$ is a partial derivative in a horizontal direction of the image, $I_{xx}$ is a second order partial derivative in the horizontal direction of the image, $I_y$ is a partial derivative in a vertical direction of the image, $I_{yy}$ is a second order partial derivative in the vertical direction of the image; and $I_{yx}$ is a second order mixed partial derivative in the horizontal and vertical directions of the image.

Each of these components (220, 230, 240, 350 and 260) can be include software, hardware and middleware or a combination thereof. They can be implemented by one or multiple computers.

System 200 can also include optical system 270 configured to optically obtain the image.

A computer program product can be provided. In includes a computer readable medium that stores instructions for executing method 100. It can include instructions for obtaining an image of an area of a lithographic mask; wherein the image is generated by an optical system that is partially coherent; calculating a gradient of the image and a second derivative of the image in a direction of the gradient of the image; calculating a function that is proportional to the second derivative of the image in the direction of the gradient of the image and is inversely proportional to a ratio between a square of the gradient of the image and the image; and detecting at least one edge of at least one feature of the area in response to values of the function.

Numerical Simulations

A number of experiments were carried in order to evaluate the mentioned above assumptions. The mentioned above method was checked on images, simulated from artificial mask layout by Solid C simulation tool. Optical parameters were adjusted to meet common parameters of partial coherent optical imaging: circular illumination aperture, numerical aperture of 0.75 and partial coherency of 0.8. Both binary and attenuated mask patterns were simulated. Precision and stability were checked.

Figure 3:
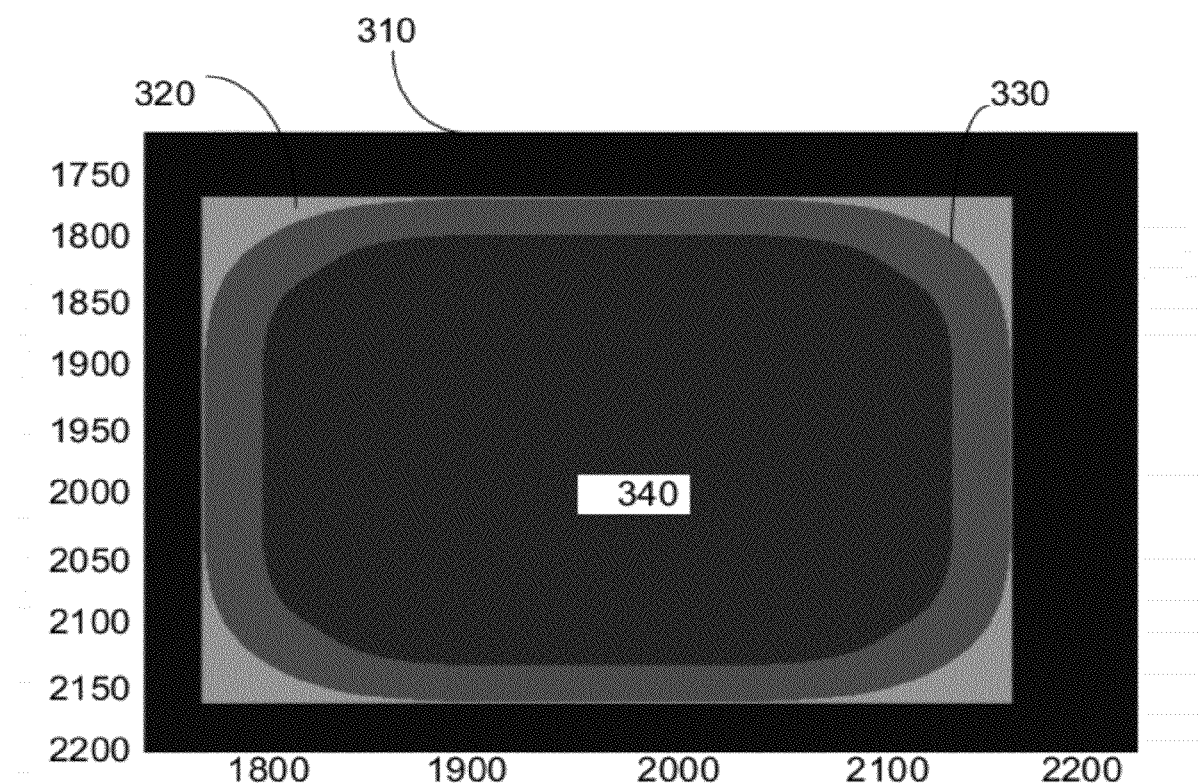
FIG. 3 illustrates a simulated image and results of applying edge detection methods on the image according to an embodiment of the invention.

In the first experiment, the method was applied on artificial mask patterns containing of simulated rectangular contact of about 400 nm×400 nm. FIG. 3 illustrates area 310, square (representative of a contact pattern printed on a mask) 320, prior art estimation 340 of the contact and an estimation 330 of the contact obtained by applying method 100. Prior art estimation 340 is smaller than estimation 330 and contact 320. It is characterized by biases of up to 35 nm from each side, resulting in a CD error of 70 nm. Estimation 330 is much more accurate and is characterized by a bias of about 3 nm and a slightly larger bias at the corners of rectangular 320.

Figure 4:
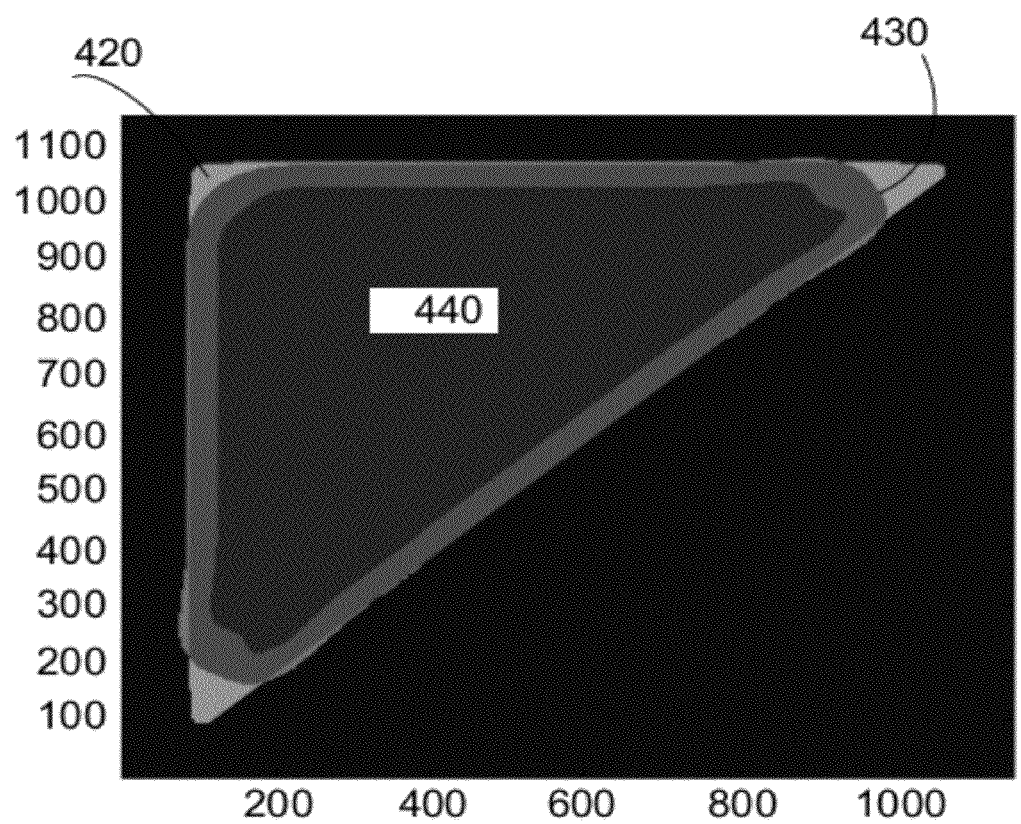
FIG. 4 illustrates a simulated image and results of applying edge detection methods on the image according to an embodiment of the invention.
Figure 5:
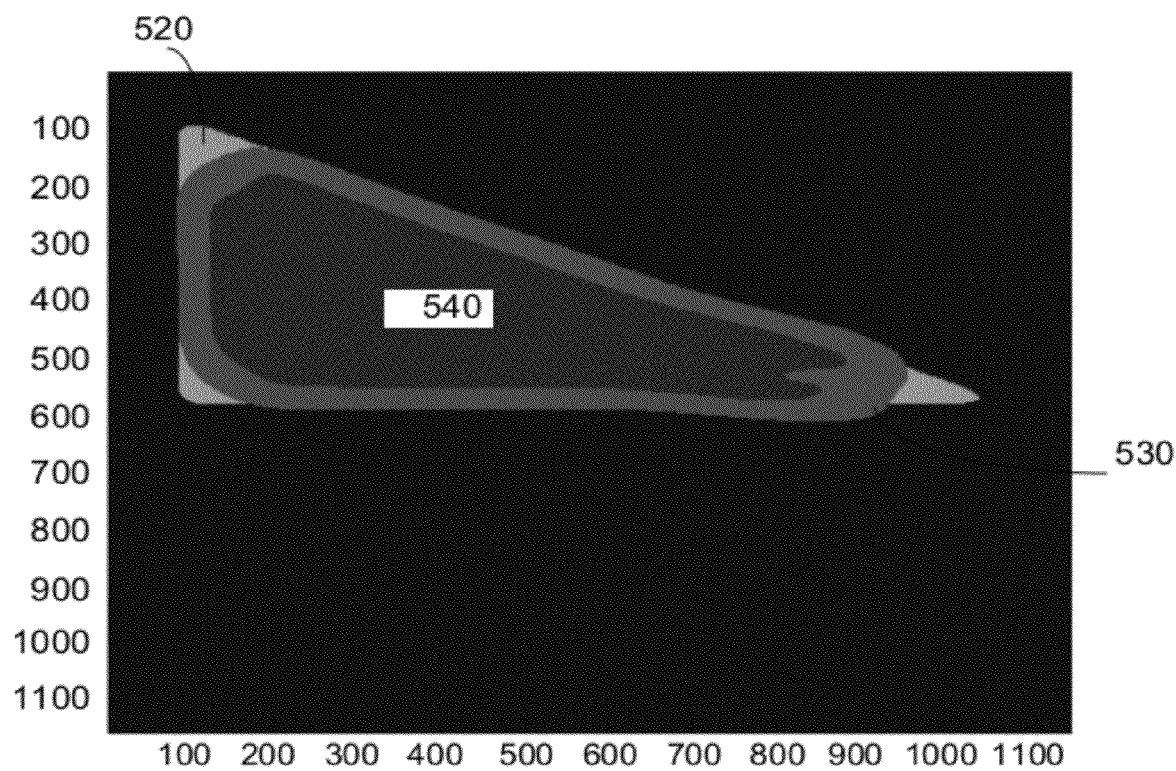
FIG. 5 illustrates a simulated image and results of applying edge detection methods on the image according to an embodiment of the invention.

FIG. 4 illustrates the estimation of rectangular 420 that has 90, 45 and 45 degrees angles and FIG. 5 illustrates the estimation of rectangular 520 that has 90, 30 and 60 degrees angles. In both cases the appliance of method 100 resulted in estimations 430 and 530 that were much better than prior art estimations 440 and 540.

It is noted that when applying method 100 the stable regions of pattern (i.e. straight lines) can be recovered without any error while the corners are rounded due to optics effects. In fact, optics acts as a kind of low pass filter so that sharp features may not be recovered by such a technique.

Real Images Results

Method 100 was also evaluated by processing a real optical image of an area of a mask. The results of applying a prior art edge detection method and of applying method 100 were compared to a SEM image of the area.

Figure 6:
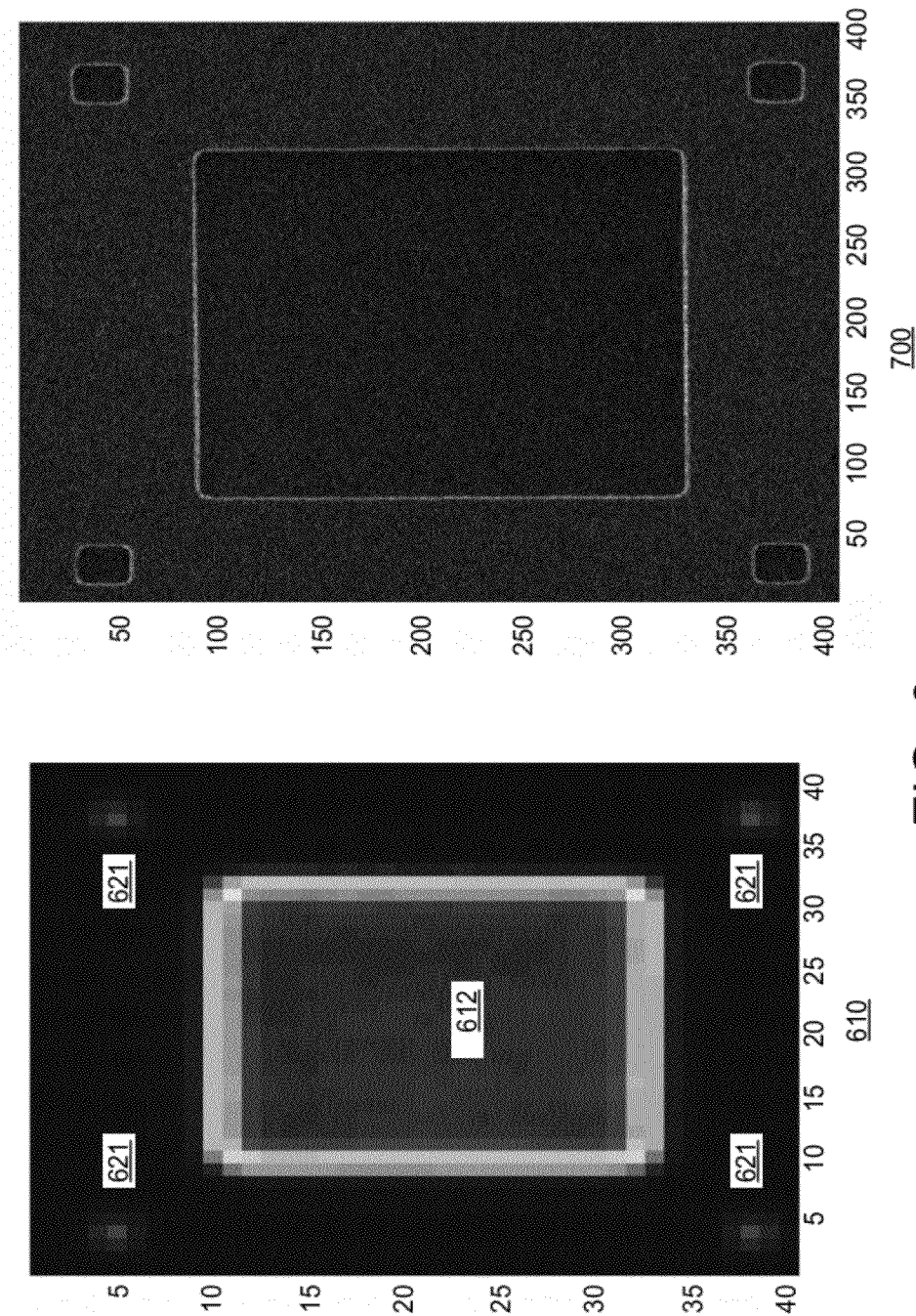
FIG. 6 illustrates an optical image and a SEM image of an area of a mask.
Figure 7:
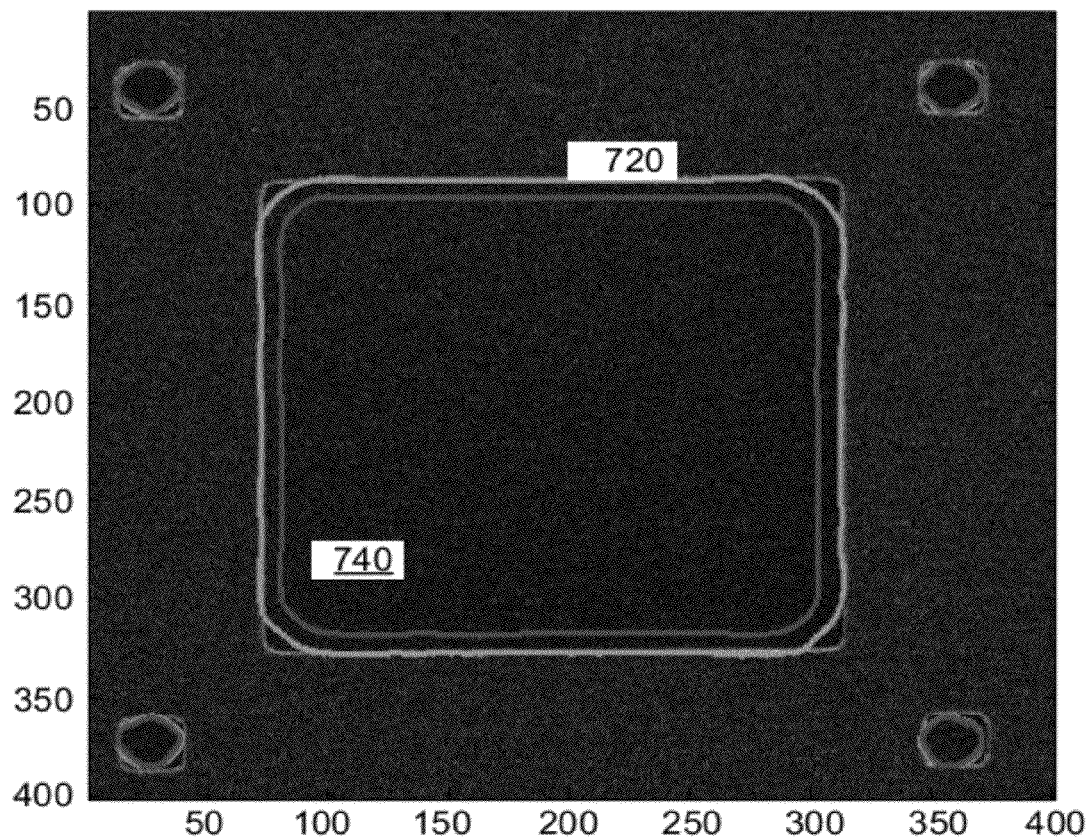
FIG. 7 illustrates the SEM image of FIG. 6 of an area of a mask and results of applying edge detection methods on the image according to an embodiment of the invention.

FIG. 6 illustrates optical image 610 and a SEM image 700 of an area of a mask. FIG. 7 illustrates the SEM image of FIG. 6 of an area of a mask and results 720 and 740 of applying edge detection methods on optical image 610 according to an embodiment of the invention.

The area included a 3 micron square 612 surrounded by for four small contacts 621, 622, 623 and 524 of 300 nm. Optical image 610 was inspected with an optical system that has a numerical aperture (NA) of 0.35 and sigma of σ=0.88 with circular polarization and a pixel size of 120 nm. SEM image 700 was obtained with pixel size of 12 nm.

Results 720 were obtained by applying a prior art edge detection method and results 740 were obtained by applying method 100. Results 720 were much more accurate, especially in relation to the 3 micron square 612.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A method for edge detection, the method comprises:
obtaining an image of an area of a lithographic mask; wherein the image is generated by an optical system that is partially coherent;
calculating a gradient of the image and a second derivative of the image in a direction of the gradient of the image;
calculating a function that is proportional to the second derivative of the image in the direction of the gradient of the image and is inversely proportional to a ratio between a square of the gradient of the image and the image; and
detecting at least one edge of at least one feature of the area in response to values of the function.

2. The method according to claim 1 comprising calculating the function by subtracting from one half of the second derivative of the image in the direction of the gradient of the image one fourth of the ratio between the square of the gradient of the image and the image and detecting the at least one edge by searching for zero crossings of the function.

3. The method according to claim 2 comprising detecting a location of the at least one edge by compensating for misalignments introduced by the optical system.

4. The method according to claim 3 comprising determining a critical dimension in response to a difference between locations of edges regardless of misalignments introduced by the optical system.

5. The method according to claim 2 comprising determining a critical dimension in response to a difference between locations of edges.

6. The method according to claim 1 comprising calculating the second derivative of the image in the direction of the gradient of the image by: $(I_x^2 \ast I_{xx} + 2 \ast I_x \ast I_y \ast I_{xy} + I_y^2 \ast I_{yy})/(I_x^2 + I_y^2)$; wherein $I_x$ is a partial derivative in a horizontal direction of the image, $I_{xx}$ is a second order partial derivative in the horizontal direction of the image, $I_y$ is a partial derivative in a vertical direction of the image, $I_{yy}$ is a second order partial derivative in the vertical direction of the image; and $I_{yx}$ is a second order mixed partial derivative in the horizontal and vertical directions of the image.

7. The method according to claim 1 comprising optically obtaining the image.

8. A system for edge detection, the system comprises:
a memory unit configured to receive an image of an area of a lithographic mask; wherein the image is generated by an optical system that is partially coherent;
a gradient calculator configured to calculate a gradient of the image;
a second derivative calculator configured to calculate the second derivative of the image in a direction of the gradient of the image;
a function calculator that is configured to calculate a function that is proportional to the second derivative of the image in the direction of the gradient of the image and is inversely proportional to a ratio between a square of the gradient of the image and the image; and
an edge detector configured to detect at least one edge of at least one feature of the area in response to values of the function.

9. The system according to claim 8 wherein the function calculator is configured to calculate the function by subtracting from one half of the second derivative of the image in the direction of the gradient of the image one fourth of the ratio between the square of the gradient of the image and the image and detecting the at least one edge by searching for zero crossings of the function.

10. The system according to claim 9 wherein the edge detector is configured to detect a location of the at least one edge by compensating for misalignments introduced by the optical system.

11. The system according to claim 10 comprising a critical dimension unit configured to determine a critical dimension in response to a difference between locations of edges regardless of misalignments introduced by the optical system.

12. The system according to claim 10 comprising a critical dimension unit that is configured to determine a critical dimension in response to a difference between locations of edges.

13. The system according to claim 8 wherein the function calculator is configured to calculate the second derivative of the image in the direction of the gradient of the image by: $(I_x^2 \ast I_{xx} + 2 \ast I_x \ast I_y \ast I_{xy} + I_y^2 \ast I_{yy})/(I_x^2 + I_y^2)$; wherein $I_x$ is a partial derivative in a horizontal direction of the image, $I_{xx}$ is a second order partial derivative in the horizontal direction of the image, $I_y$ is a partial derivative in a vertical direction of the image, $I_{yy}$ is a second order partial derivative in the vertical direction of the image; and $I_{yx}$ is a second order mixed partial derivative in the horizontal and vertical directions of the image.

14. The system according to claim 8 comprising an optical system configured to optically obtain the image.

15. A computer program product comprising a computer readable medium that stores instructions for:
obtaining an image of an area of a lithographic mask; wherein the image is generated by an optical system that is partially coherent;
calculating a gradient of the image and a second derivative of the image in a direction of the gradient of the image;
calculating a function that is proportional to the second derivative of the image in the direction of the gradient of the image and is inversely proportional to a ratio between a square of the gradient of the image and the image; and
detecting at least one edge of at least one feature of the area in response to values of the function.

16. The computer program product according to claim 15 wherein the computer readable medium stores instructions for: calculating the function by subtracting from one half of the second derivative of the image in the direction of the gradient of the image one fourth of the ratio between the square of the gradient of the image and the image and detecting the at least one edge by searching for zero crossings of the function.

17. The computer program product according to claim 16 wherein the computer readable medium stores instructions for detecting a location of the at least one edge by compensating for misalignments introduced by the optical system.

18. The computer program product according to claim 17 wherein the computer readable medium stores instructions for determining a critical dimension in response to a difference between locations of edges regardless of misalignments introduced by the optical system.

19. The computer program product according to claim 16 wherein the computer readable medium stores instructions for comprising determining a critical dimension in response to a difference between locations of edges.

20. The computer program product according to claim 15 wherein the computer readable medium stores instructions for calculating the second derivative of the image in the direction of the gradient of the image by: $(I_x^2*I_{xx}+2*I_x*I_y*I_{xy}+I_y^2*I_{yy})/(I_x^2+I_y^2)$; wherein $I_x$ is a partial derivative in a horizontal direction of the image, $I_{xx}$ is a second order partial derivative in the horizontal direction of the image, $I_y$ is a partial derivative in a vertical direction of the image, $I_{yy}$ is a second order partial derivative in the vertical direction of the image; and $I_{yx}$ is a second order mixed partial derivative in the horizontal and vertical directions of the image.

\* \* \* \* \*